United States Patent
Despotidis et al.

(10) Patent No.: US 7,305,623 B2
(45) Date of Patent: Dec. 4, 2007

(54) METHOD AND APPARATUS FOR MANAGING AND REPRESENTING ELEMENTS IN A NETWORK

(75) Inventors: Teresa A. Despotidis, Morganville, NJ (US); Robert W. Junnier, Middletown, NJ (US); Kao-Shien Liu, Holmdel, NJ (US); Srinivasan K. Nangavaram, Ocean Township, NJ (US); Lucia C. Sekino, Holmdel, NJ (US); Jaspal S. Virdee, Marlboro, NJ (US); Rui Yang, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 575 days.

(21) Appl. No.: 10/011,065

(22) Filed: Dec. 3, 2001

(65) Prior Publication Data
US 2003/0103077 A1    Jun. 5, 2003

(51) Int. Cl.
*G06F 3/00* (2006.01)
*G06F 9/00* (2006.01)
*G06F 17/00* (2006.01)

(52) U.S. Cl. .................. 715/736; 715/734; 715/738

(58) Field of Classification Search .............. 345/734, 345/738, 473, 736, 442, 856; 715/500.1; 315/169.3; 370/392; 398/5
See application file for complete search history.

(56) References Cited

U.S. PATENT DOCUMENTS

| | | | | |
|---|---|---|---|---|
| 5,566,292 | A * | 10/1996 | Krembs | 345/442 |
| 5,619,636 | A * | 4/1997 | Sweat et al. | 715/500.1 |
| 5,818,462 | A * | 10/1998 | Marks et al. | 345/473 |
| 5,933,258 | A * | 8/1999 | Flanagan et al. | 398/5 |
| 6,225,999 | B1 * | 5/2001 | Jain et al. | 345/734 |
| 6,246,409 | B1 * | 6/2001 | Veghte et al. | 345/738 |
| 6,295,295 | B1 * | 9/2001 | Wicklund | 370/392 |
| 6,559,872 | B1 * | 5/2003 | Lehikoinen et al. | 345/856 |
| 6,570,867 | B1 * | 5/2003 | Robinson et al. | 370/351 |
| 6,608,635 | B1 * | 8/2003 | Mumm | 345/736 |
| 6,680,580 | B1 * | 1/2004 | Sung | 315/169.3 |
| 2002/0135610 | A1 * | 9/2002 | Ootani et al. | 345/734 |

* cited by examiner

*Primary Examiner*—Kristine Kincaid
*Assistant Examiner*—Boris Pesin

(57) ABSTRACT

A method for managing a communications network comprising a plurality of nodes by representing the network as a plurality of areas comprising respective portions of the plurality of nodes, each of the areas coupled to at least one other area via a bridge comprising at least one communications link the representations used to provide imagery for a graphical user interface (GUI).

19 Claims, 10 Drawing Sheets

FIG. 3
GEOGRAPHIC AREAS

FIG. 4
CUSTOMER AREAS

WaveStar NMS: Find Node Query Box 10

NE ID: [ * ] — 912

[ OK ] [ Apply ] [ Reset ] [ Closed ] [ Help ]

WaveStar NMS: Find Node 10

File  Edit  View  Action  Help

Query Summary

NE ID: [ * ] — 922

| NE ID | Type | Area ID |
|---|---|---|
| BBTH | BBOX | UNASSIGNED |
| BBTH2 | BBOX | UNASSIGNED |
| ITM_NM1 | ITM_XMV1 | CONTROLLER |
| ITMNM | ITMNM | CONTROLLER |
| JV2_155C4/1 | 155C4 | UNASSIGNED |
| JV2_155C4/2 | 155C4 | UNASSIGNED |
| JV2_155C4/3 | 155C4 | UNASSIGNED |
| JV2_155C6/1 | 155C6 | UNASSIGNED |
| JV2_155C6/2 | 155C6 | UNASSIGNED |
| JV2_155C6/3 | 155C6 | UNASSIGNED |
| JV2_ADM16/4/1 | ADM16/4 | UNASSIGNED |
| JV2_ADM16/4/2 | ADM16/4 | UNASSIGNED |
| JV2_ADM16/4/3 | ADM16/4 | UNASSIGNED |

STATUS SGN 12011 FIND COMPLETED   RECORDS: 74 of 74   2001-01-25 09:48:09

FIG. 10

METHOD AND APPARATUS FOR MANAGING AND REPRESENTING ELEMENTS IN A NETWORK

TECHNICAL FIELD

The invention relates to the field of communication systems and, more specifically, to the management of a communication system comprising a relatively large number of nodes.

BACKGROUND OF THE INVENTION

Telecommunication networks and other networks are increasing in both size and complexity. Unfortunately, as such networks increase in size, the network management function also increases in complexity. This means that critical tasks such as provisioning (allocating resources to form a communications link), restoration, reinstatement and the like must be completed in a reasonable time using network management tools available to a network manager.

In a provisioning mode, for example, an operator specifies all details of a circuit such as end points, appropriate links, time slots and network elements. The provisioning mode allows the operator to select a particular circuit for routing a communication, such as a telephone call or other communication. The operator interacts with the system via a graphical user interface (GUI) that represents the network including the circuit to be provisioned.

Unfortunately, the display of a relatively large network is quite crowded due to the number of graphical objects displayed. Moreover, performance of the GUI and control systems linked thereto tends to be degraded by the large amount of information exchanged by different subsystems, such as fault management modules, performance monitoring modules, configuration management module, graphical user interface modules and the like.

SUMMARY OF THE INVENTION

A method according to an embodiment of the invention comprises dividing representations of network elements within a network into a plurality of areas, each area having associated with it a respective plurality of network elements; displaying, in response to user interaction, those network elements within a selective area of network elements; and displaying, in response to a provision requirement, those network elements within other area of network elements required to provision a desired circuit. In response to user interactions, a user selected area is graphically expanded to reveal its constituent network elements, which network elements may then be selected by the user.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The subject invention will be described within the context of a transport telecommunication system comprising a large number of network elements or nodes. It will be appreciated by those skilled in the art that any form of communication may be utilized, such as telecommunication, data communication, streaming media communication and the like. Thus, it is contemplated by the inventors that the subject invention has broad applicability beyond the telecommunication network described herein. Specifically, the subject invention is applicable to the management of any multi-node communication network, regardless of the number of network elements deployed in the communication network or the type of communication links utilized by the communication network.

The invention advantageously simplifies the representation and management functions needed to provide provisioning, restoration and reinstatement management, fault monitoring services for a network. Provisioning comprises the process of selecting the start and end points (nodes) of a communication path, optionally selecting some or all of the nodes and links connecting the start and end nodes, finding the "best" communication path between the start and end nodes, and generating the commands to each of the nodes within the "best" path such that cross connects within the network cause the path to be formed such that traffic may flow through the provisioned circuit. Restoration is the process of selecting an alternate path in the event of a break in the originally provisioned circuit. In response to such a break, commands are generated to cause new cross-connections in network elements to create the alternate communications path and to cause affected network elements forming the initially provisioned communications path to disconnect. Reinstatement is the process of restoring the originally provisioned circuit after the circuit breaks or other anomaly resulting in a restoration process has been resolved.

Figure 1:
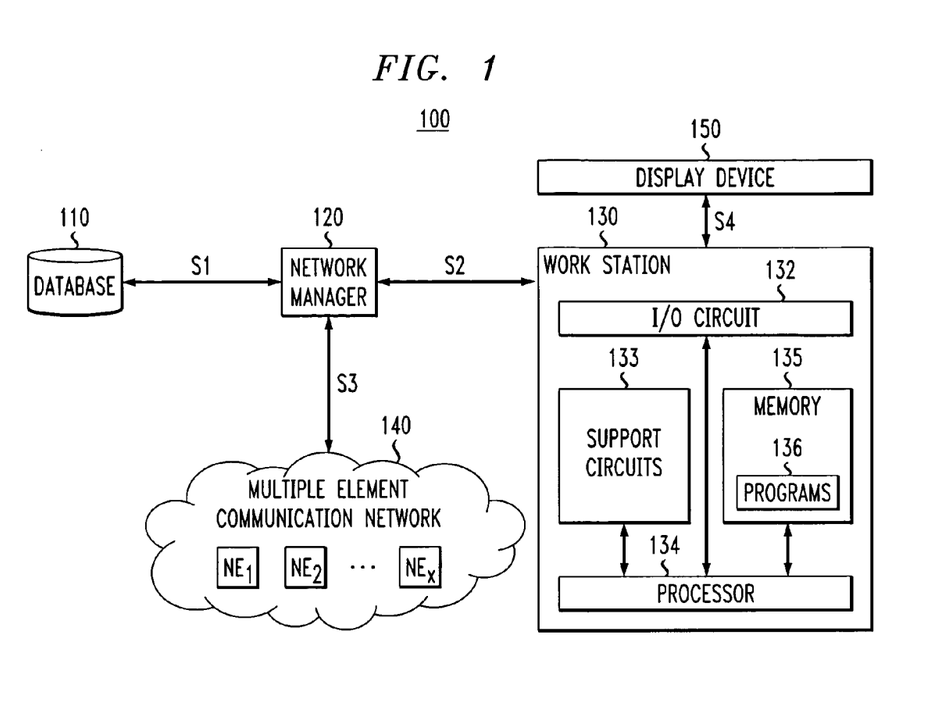
FIG. 1 depicts a high-level block diagram of a communications system including the present invention.

FIG. 1 depicts a high-level block diagram of a communications system including the present invention. Specifically, the communications system 100 of FIG. 1 comprises a database 110, a network manager or controller 120, a workstation 130 and a multi-node communication network 140.

The multi-node communication network 140 comprises a plurality of network elements (NE) denoted as network elements $NE_1$ through $NE_x$ (collectively network elements NE). Each communication to be transmitted from a start network element or start-node to an end network element or end-node requires the determination by the network manager 120 of an appropriate communications path. Advantageously, the subject invention operates to simplify the graphical representation of the network and facilitate rapid provisioning operations and other network management functions.

The multi-node communication network 140 is coupled to the network manager 120 via signal path S3. The network manager 120 is used to manage various network operations such as the routing of communications and other functions.

The database 110 may comprise a mass storage device, such as a redundant array of inexpensive devices (RAID) or other known mass storage device. All that is necessary is that the data base 110 be able to communicate with the network manager 120 in a manner facilitating the storage and retrieval of information, such as characterization and control information pertaining to the multi-node communication network 140.

The workstation 130 communicates with the network manager 120 via, for example, a computer network. It will be appreciated by those skilled in the art that more or fewer workstations 130 may be provided within the network management system 100 of FIG. 1.

The work stations 130 comprises, for example, a terminal used by a network operator to request the provisioning of communication circuits between start-nodes and end-nodes in response to, for example, requests for such circuits from network users. The workstations 130 may also comprise interfaces between network system users and customers and the network manager 120.

The network manager 120 and database 110 of the communications system 100 of FIG. 1 are depicted as separate functional entities. However, it will be appreciated by those skilled in the art that the network manager 120 and database 110 may be combined within a single functional entity. Thus, the network manager 120 and database 110 may be operably combined to form a network management apparatus suitable for managing the multi-node communication network 140 according to the present invention.

In one embodiment of the invention, the network manager 120 comprises, illustratively, an Integrated Transport Management Network Manager (WS-NMS) manufactured by Lucent Technologies, Inc. of Murray Hill, N.J. In this embodiment, the network manager 120 implements network management layer functions according to, for example, the Telecommunications Management Network (TMN) standards described in the International Telecommunications Union (ITU) recommendation M.3010 and related documents, which are incorporated herein by reference in their entirety. Thus, the network manager 120 is used to manage all element management systems and network elements within the communications system 100 of FIG. 1, both individually and as a set of network elements. The network manager 120 can include or be operatively coupled to various element management systems (not shown) according to the various management layer functions described in the TMN standard.

The workstation 130 generates graphical user interface (GUI) imagery that is displayed on the display device 150. The displayed imagery representing the network map is modified according to the present invention to represent related groups of network elements or nodes as corresponding areas of network elements or nodes. That is, as discussed in more detail below with respect to FIGS. 3-6, the network elements within the communications network 140 are logically arranged as a plurality of areas, where only areas are displayed by the GUI. An exemplary workstation 130 will be discussed in more detail below with respect to FIG. 2.

In a provisioning mode, a work station user selects a start-node and an end-node on the graphically displayed network map. Since the invention provides a graphical display comprising areas, the user first selects the areas associated with the start-node and end-node. When the appropriate area has been selected, the graphical representation of the network expands the selected areas to display network elements, which may then be selected as start-nodes and/or end-nodes. Start-nodes and end-nodes may be selected without expanding their respective areas during provisioning, though ports on the start-nodes and end-nodes may need to be selected. Areas comprise network elements, links, aggregates containing at least one network element and, typically, many network elements (it should be noted that empty areas are also supported). The network elements within a particular area may be associated due to geographic proximity to each other (e.g., within a single metropolitan area, region or country), customer ownership (e.g., an intranet owned by a company or a network owned by a cooperating telecommunications provider) or network elements having a similar technology (e.g., optical network elements, non-optical network elements and the like).

In the case of where network elements required for provisioning/monitoring are across a set of areas, the invention provides for "user defined submaps." These submaps comprise groups of network elements or areas selected by the user or otherwise related in a logical manner. In any event, the user selects the start-node and end-node of a circuit to be provisioned.

The user then selects each link in a communications path between the start-node and end-node and sends a request to a host computer to retrieve a list of spare channels on each selected link or bridge between nodes/areas. Since inter-area links are displayed as a single link or "bridge" between areas, the selection of an inter-area link or bridge results in a GUI display of some portion or all of the links connecting the two areas. In the case of a link directly connected to a selected start-node or end-node, that inter-area link is indicated as on option (e.g., by highlighting or other visual indication). As the links are progressively selected, intra-area links are expanded as necessary to enable the operator or user to select the appropriate connections over which the circuit is to be provisioned.

Selecting a connection presents a user with the list of spare channels, displayed in a table. The user then selects a channel to be used in forming the provisioned circuit: user repeats this for other links. After selecting sufficient channels to provision the circuit, a request to provision is transmitted to the host. The user then selects the required time slots using the GUI. This procedure is repeated for each link in the communications path to be provisioned, which may comprise up to 80 links or more.

After selecting the time slot for each link between the start-node and end-node, the host computer arranges the selected links (i.e., the selected channel and time slot for each link) in the correct order and sends commands to each network element which, when implemented, result in the provisioning of the cross-connects and other network elements forming the complete communication path between the start-node and end-node. At this point, traffic may flow through the circuit. A method according to the above operating description will be discussed below with respect to FIG. 7.

Within the context of the present invention, a plurality of network elements within a network are divided into areas, where each area comprises a respective portion of the network elements. In one embodiment, an initial area displayed within the graphical user interface is deemed to be an "unassigned" area. The initial area includes unassigned nodes and aggregates collection of nodes. The unassigned area cannot be deleted by the user. As a matter of abstraction, areas are the highest level objects depicted on the network map. Areas do not include other areas. Areas contain nodes, aggregates and links.

A "privileged" user may create, using the work station 130, areas and assign nodes and aggregates within the network to the created areas. Moreover, a privileged user can modify or delete the created areas. Changes made to areas by such a privileged user may be indicated on the user interface via modifications to the icons representing the areas changed. Other users may retrieve updated area information for use in their workstations via system queries. Within the context of the present invention, it is contemplated that all network elements within a network are assigned to an area. Such assignment is controlled by the privileged user who may subsequently reassign nodes on an area map to other areas. The user with correct privileges may modify or delete nodes within the database 110 or links within the database 110.

Figure 2:
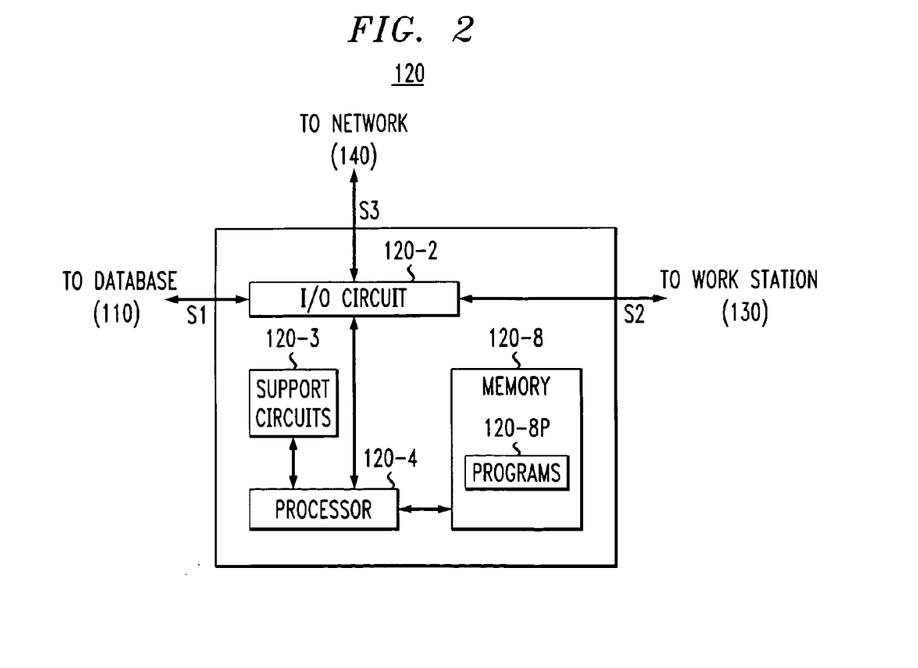
FIG. 2 depicts a high-level block diagram of a network manager suitable for use in the communications system of FIG. 1.

FIG. 2 depicts a high-level block diagram of a network manager or controller suitable for use in the communications system 100 of FIG. 1. Specifically, the exemplary network manager or controller 120 of FIG. 2 comprises a processor 120-4 as well as memory 120-8 for storing various network management and control programs 120-8P. The processor 120-4 cooperates with conventional support circuitry 120-3 such as power supplies, clock circuits, cache memory and the like as well as circuits that assist in executing the software routines stored in the memory 120-8. As such, it is contemplated that some of the process steps discussed herein as software processes may be implemented within hardware, for example, as circuitry that cooperates with the processor 120-4 to perform various steps. The network manager 120 also contains input-output circuitry 120-2 that forms an interface between the various functional elements communicating with the network manager 120. For example, in the embodiment of FIG. 1, the network manager 120 communicates with a data base 110 via a signal path S1, each of a plurality of work stations 130 via signal path S2, the communication network to be managed 140 via signal path S3, and a remote work station 132 via signal path S4.

Although the network manager 120 of FIG. 2 is depicted as a general purpose computer that is programmed to perform various network management functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

The network manager 120 of the present invention communicates with the workstation 130 operated by, for example, network operators servicing customers requesting the provisioning or restoration of specific connections.

The present invention implements one or more of the following features within the context of a network management system: (1) graphical connectivity; (2) span of control; and (3) submapping.

The graphical connectivity feature allows a work station user to graphically see the communications links, selected channels and network elements or nodes at the end of these communications links during the provisioning of circuits. The graphical connectivity feature enables the management system to determine various parameters associated with communications links as they are selected and connected, and update the graphical representation of the connectivity of these communications links dynamically for a user. Within the context of the graphical user interface, a graphical connectivity panel (GCP) is displayed on the display device 150 associated with the workstation 130. The graphical connectivity panel allows the user to graphically see selected links, channels and nodes at the end of the selected links during the provisioning of circuits. The displayed graphical elements or icons representing physical elements within the network (such as nodes, links, channels, etc.) are updated dynamically as a circuit is built or provisioned. Similarly, link or circuit breakage and restoration within the monitored communications network is also graphically represented.

The span of control feature allows the work station user to partition a larger network into smaller, more manageable, sub-networks, which are referred to herein as "areas." The areas provide logical groupings of network elements having a predefined commonality, such as geographic location, customer location or ownership, customer traffic, network topology, network capacity, bandwidth availability and the like. Each of the areas may be connected by a "bridge" to other areas within the partitioned larger network. Each bridge comprises at least one communications link. Each link typically comprises a plurality of communications channels. In this manner, inter-area communications channels are aggregated into respective bridges such that a simple representation of the network is achieved.

The segmentation of a large network into a plurality of smaller sub-networks avoids display clutter within the GUI environment. Moreover, by avoiding the display of all network elements, and/or avoiding the display of areas unnecessary to a particular task, data base access and other information processing operations associated with the non-displayed network elements or areas are avoided, thereby providing greater system efficiency.

The submapping feature for a WS-NMS WAVESTAR NETWORK MANAGEMENT SYSTEM allows a user to create customized maps or submaps based upon areas or network elements for circuit provisioning, fault monitoring and other operations. For example, in the case of network management operations such as provisioning operations utilizing network elements within two or more areas, a user defined submap provides a reduced-clutter display of predefined network elements within these areas such that those network elements which will not be utilized in the management function are not displayed. The user-defined submap allows the user to create a submap of network elements from different areas.

The submap allows the user to provision and/or monitor selected nodes or network elements/links within the submap regardless of the area within which the selected nodes are included. It is noted that a node may be present in more than one user-defined submap, and that instances of the node are saved in the submaps while the parent node remains in the assigned area. That is, when a graphical object defined herein as a submap is instantiated, network elements or node objects are also instantiated. The instantiated network elements or nodes comprise graphical objects representing the actual network elements or nodes previously grouped within respective areas. Thus, while the actual network element or node is logically grouped in a respective area as previously discussed, the instantiated graphical representation of the network elements or nodes may be re-used such that a plurality of submaps may include common network elements or nodes.

Another advantage of submapping is the facilitation of repetitive provisioning of logical circuits within the same set of network elements. The use of submapping for this purpose greatly enhances operator productivity.

Figure 3:
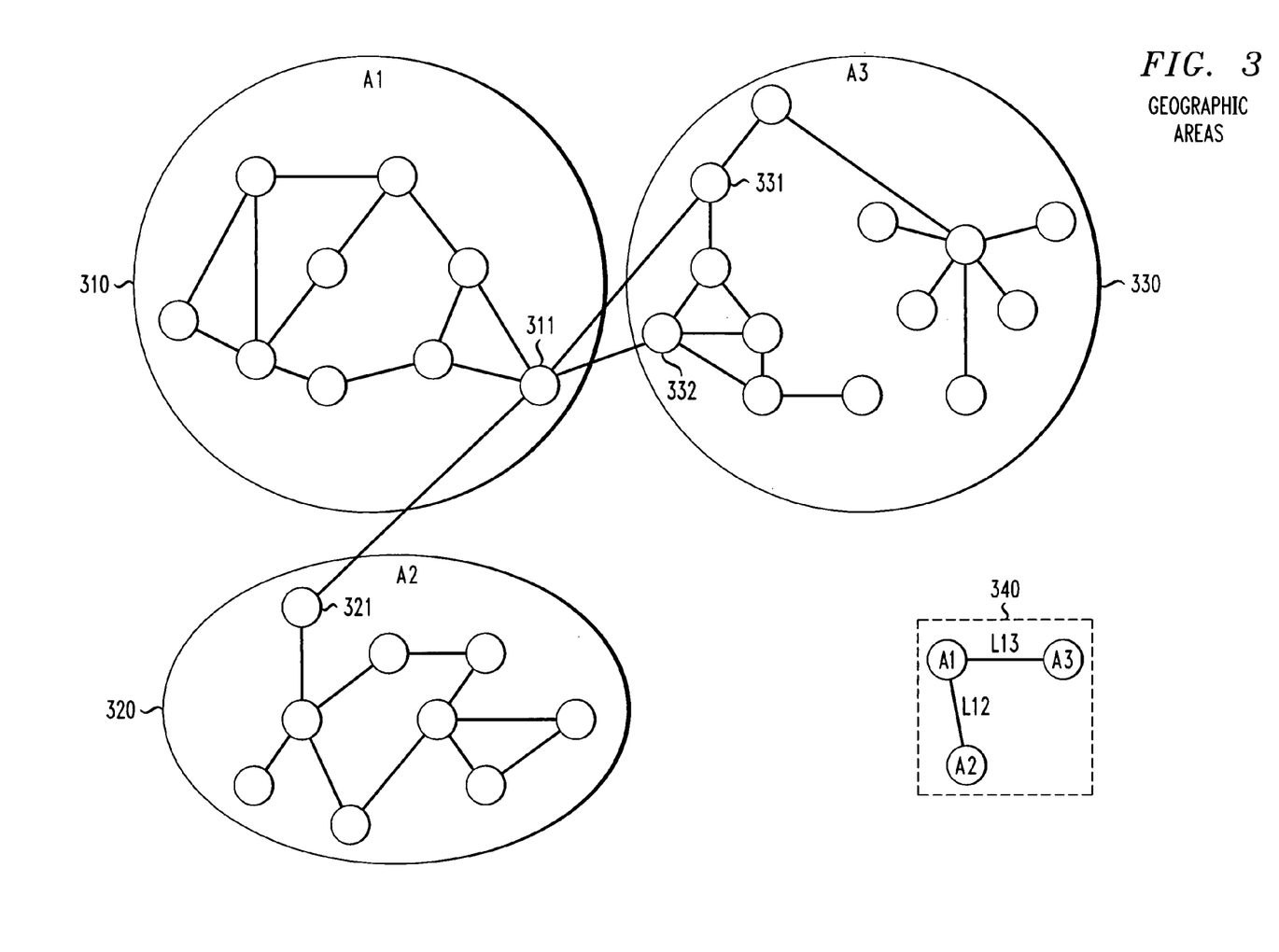
FIG. 3 depicts a graphical representation of a communications network divided into areas.

FIG. 3 depicts a communications network comprising a plurality of network elements divided into three areas; namely, a first area A1 a second area A2 and a third area A3. The areas depicted in FIG. 3 are defined according to geographic boundaries. An image 340 of the three areas is also depicted in FIG. 3. The image 340 suitable to display on the display device 150 The image 340 depicts the first area A1 coupled to the third area A3 via a link $L_{13}$, and the first area A1 coupled to the second area A2 via a link $L_{12}$. A first link $L_{13}$ between area Al and area A3 actually comprises two communications links; namely, a link between network element 311 of area A1 and network element 331 of area A3, and a link between NE311 and NE332 of area A3. The link $L_{12}$ comprises a single link between network element 311 and network element 321 of area A2.

Figure 4:
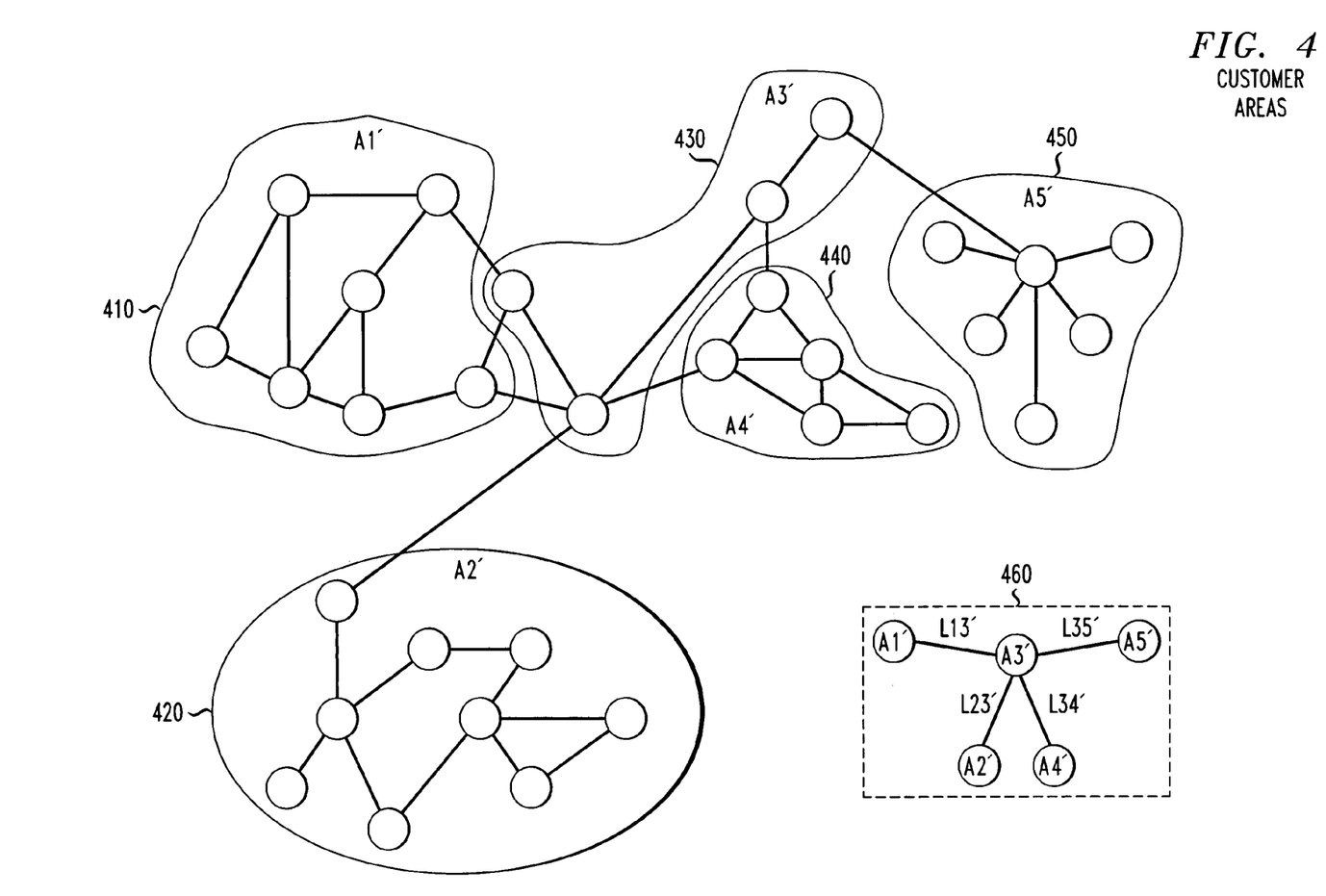
FIG. 4 depicts a graphical representation of a communications network divided into customer areas.

FIG. 4 depicts the network of FIG. 3 divided into a plurality of areas according to customer. Specifically, each of five areas A1' (410), A2' (420), A3' (430), A4' (440) and A5' (450) represent networks of respective customers. An image 460 comprises a graphical representation of the customer-delineated areas of FIG. 4. It is noted that area A3' is coupled to each of the other areas by respective link. Specifically, area A3' is coupled to area A1' via link $L_{13}$', to area A5' via link $L_{35}$', to area A4' via link $L_{34}$' into area A2' via link $L_{23}$'. As previously noted with respect to FIG. 3, each of the links L' may comprise one or more actual communication links. As noted in FIG. 4, three actual links communicate between areas A1' and A3', two actual communication links communicate between areas A3' and A4', while a single link each communicates between areas A3' and each of A2' and A5'.

Figure 5:
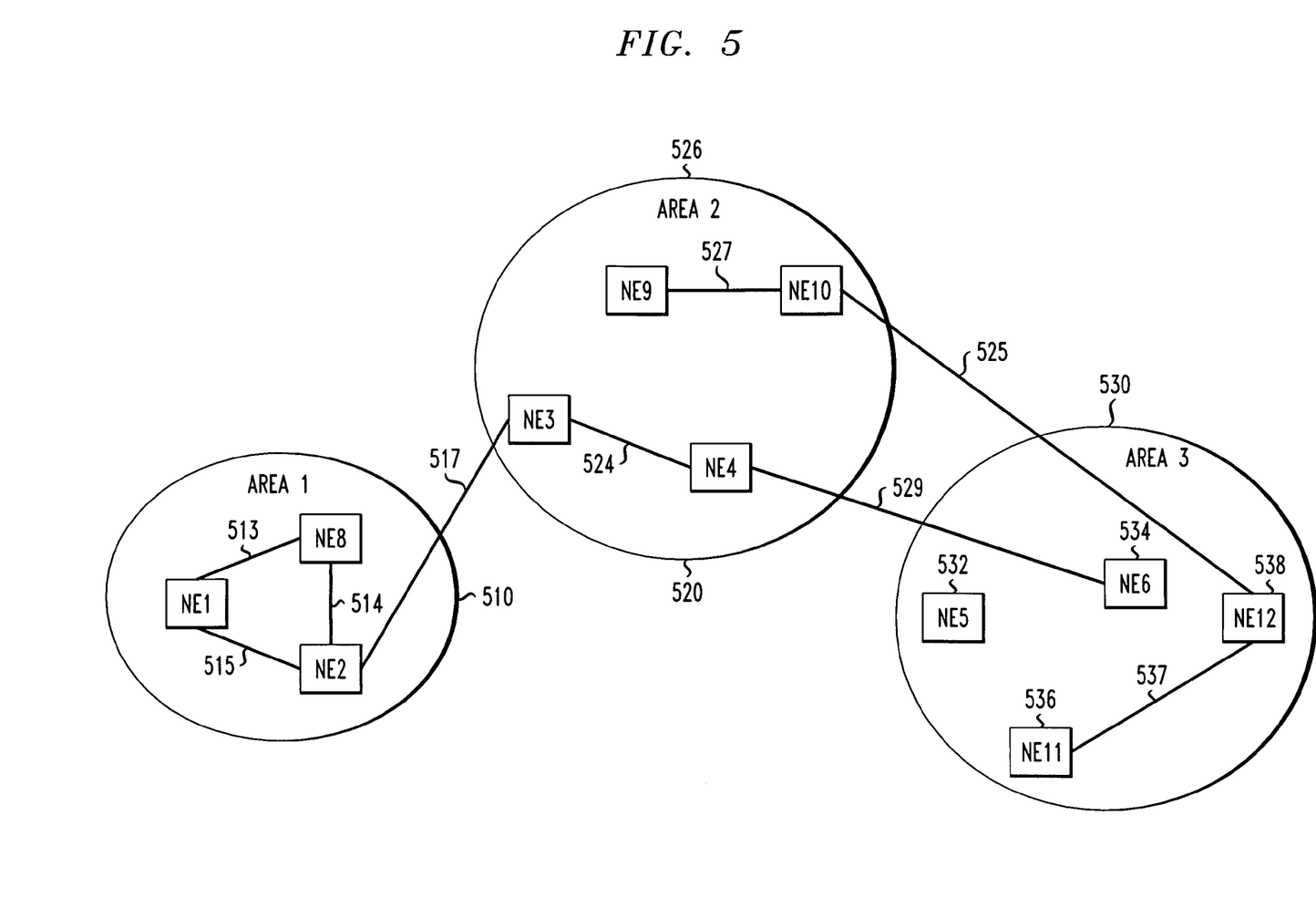
FIGS. 5 and 6 depict graphical representations of a communications networks divided into a plurality of areas and related graphical imagery.

FIG. 5 depicts a graphical representation of a communications network divided into a plurality of areas of related graphical imagery. A first area 510 comprises three network elements denoted as NE1, NE2 and NE8. Network elements NE1 and NE8 are connected via a link 513. Network elements NE1 and NE2 are connected to a link 515. Network elements NE2 and NE8 are connected via a link 514. A second area 520 comprises four network elements denoted as NE3, NE4, NE9 and NE10. Network elements NE9 and NE10 are connected via a communications link 527. Network elements NE3 and NE4 are connected via a communications link 524. A third area 530 comprises four network elements denoted as NE5, NE6, NE11 and NE12. Network elements NE11 and NE12 are coupled by a communication link 537. Several inter-area communication links are established between network elements NE2 and NE3 (link 517), network elements NE4 and NE6 (communications link 529) and NE10 and NE12 (communications link 525).

FIG. 5 also depicts a graphical connectivity panel 540 which is used to graphically represent at least a portion of the network elements and links described above with respect to areas 510, 520 and 530. The graphical connectivity panel 540 of FIG. 5 is displayed on the display device 150 in conjunction with operations of the work station 130 and the network manager 120, as previously described with respect to FIGS. 1-4. The first displayed circuit 540 comprises a circuit between network element NE9 and network element NE11. It is noted that the graphically represented provision circuit depicts a first link 519' connecting network elements NE9' and NE10', a second link 525' connecting NE10' to NE12', and a third link 537' connecting NE12' to NE11'. The second displayed circuit 555 comprises a link 513' connecting network elements NE1' and NE8' showing it has no physical connection to any of the nodes from NE9' to NE11'. Thus, by displaying the two provision circuits as shown in the graphical connectivity panel 540 of FIG. 5, along with the previous reduction in displayed network elements due to the area groupings, the amount of information required to be displayed is greatly reduced and, therefore, the management of the network contingent upon the display of such information is simplified. FIG. 5a shows an example of a protected circuit.

Figure 6:
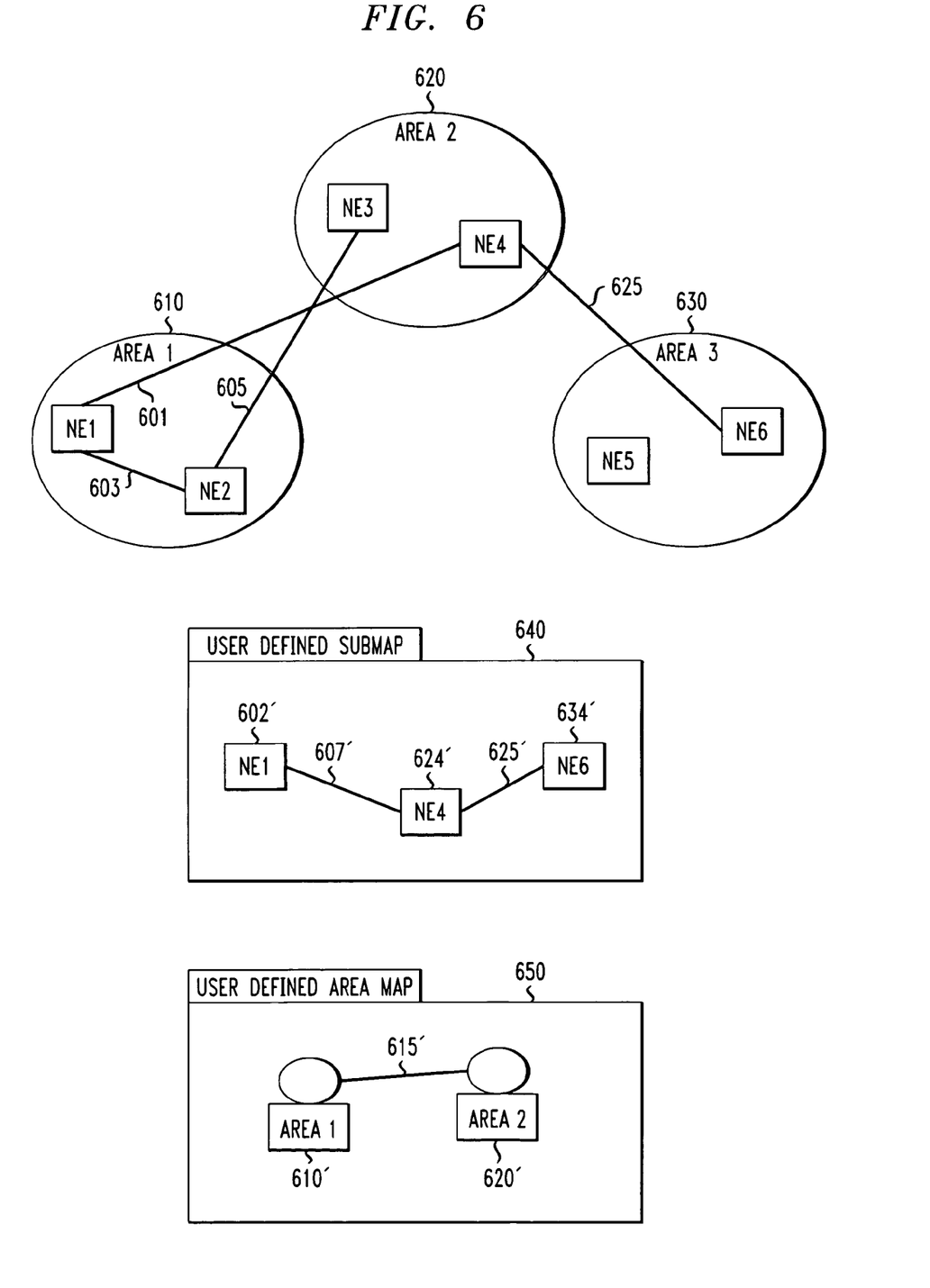

FIG. 6 depicts user defined maps showing a graphical representation of a communications network divided into a plurality of areas and related graphical imagery. Specifically, FIG. 6 depicts a graphical representation and associated imagery useful in understanding the submap and area map concepts discussed above.

A first area 610 comprises two network elements denoted as NE1 and NE2. A second area network 620 comprises two network elements denoted as NE3 and NE4. A third area 630 comprises two network elements denoted as NE5 and NE6. Network elements NE1 and NE4 are in communications via a first link 601. Network elements NE1 and NE2 are in communication via a link 603. Network elements NE2 and NE3 communicate via a link 605. Network elements NE4 and NE6 communicate via a link 625.

FIG. 6 also depicts imagery 640 associated with a user defined submap suitable for presentation on the device 150. The user-defined submap allows the user to create a submap of network elements from different areas. The submap allows a user to provision or monitor across the selected nodes in the submap without expanding areas. That is, given a plurality of network elements or nodes that happen to be within different areas, the user defined submap feature enables representation and management of these nodes via the user of the workstation 130. The submap is displayed on the display device 150. The resulting user defined submap provides information necessary to enable the user to manage the network elements within the submap while advantageously avoiding a cluttered display by avoiding the graphical representation of network elements excluded from the user defined submap. It is noted that a node or network element may be included in more than one user-defined submap. Moreover, it is noted that the instance of a node or network element is saved in the submaps while the parent node remains in within the assigned area of the parent node. While the user-defined submaps may be deleted by a user, the nodes or network elements delineated into particular areas remain within the system as defined by, for example, a privileged user. Thus, the graphical representation of a portion of the network defined across area boundaries is made utilizing the submap paradigm. This submap feature advantageously allows network element management, circuit provisioning and other functions while avoiding a cluttered display and while retaining the previously defined area groupings. Thus, user defined submaps represent a different layer of abstraction that builds upon the area delineated level of abstraction previously discussed.

FIG. 6 shows imagery 650 associated with a user defined area map. Specifically, a first area 610' and a second area 620' analogous to the areas 610 and 620 previously discussed are shown as being linked by a communication link 615'. The communication link 615' represents the two communication links (601 and 605) connecting elements with an area 610 to elements with an area 620. Within the context of network management, a user at the work station 130 selecting displayed link 615' will cause the work station 130 to retrieve via the network manager 120 information pertaining to the two communication links 601 and 605. Such information will also include terminating nodes (i.e., network elements NE1, NE2, NE3 and NE4).

Figure 7:
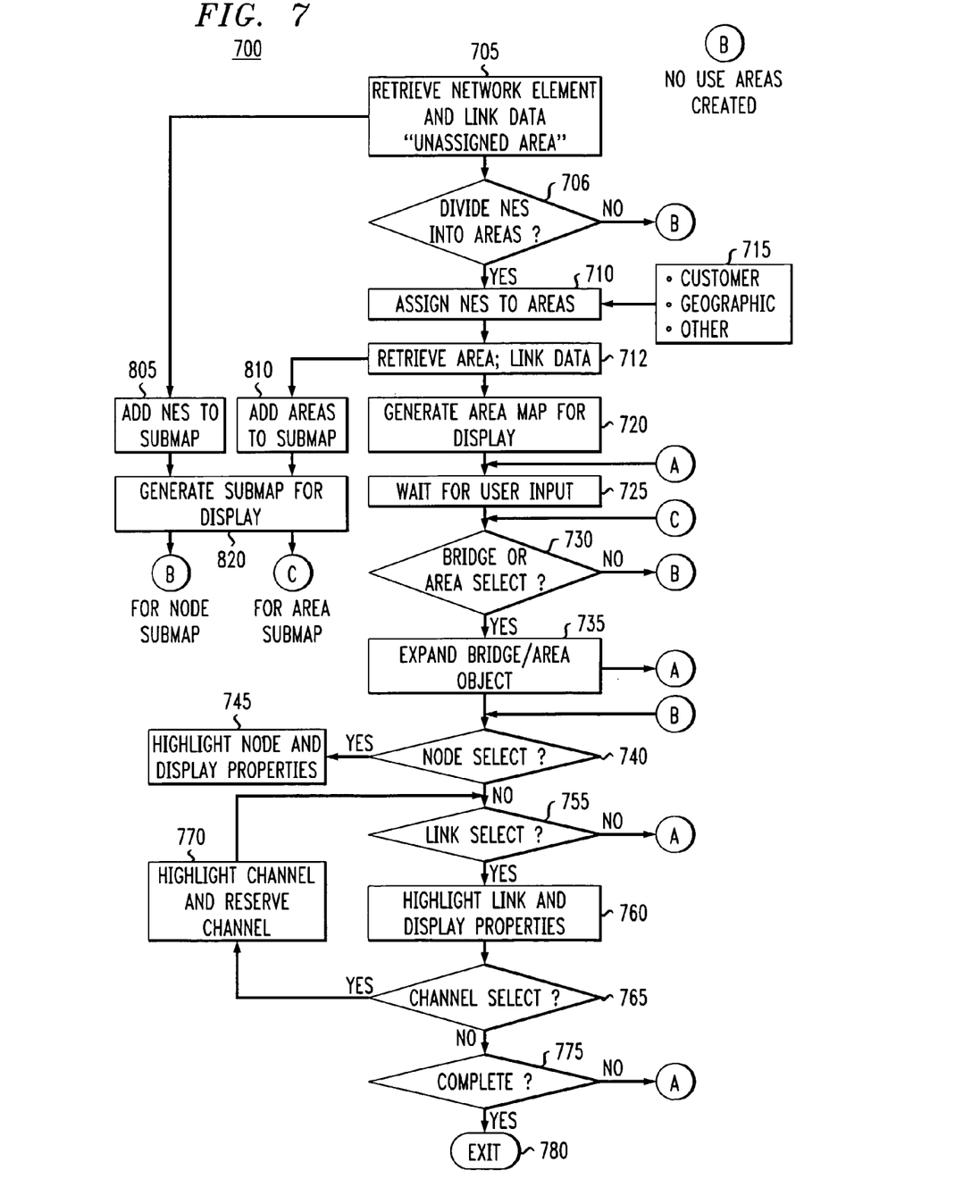
FIG. 7 depicts a flow diagram of interactions with a graphical user interface (GUI) according to the invention.

FIG. 7 depicts a flow diagram of an exemplary provisioning interaction with a graphical user interface (GUI) according to the invention. Specifically, the exemplary provisioning interactions discussed with respect to FIG. 7 illustrate adaptations made to the graphical user interface in response to user commands. It should be noted that the method 700 of FIG. 7 contemplates the generation of a sub-map as network elements and links are selected. However, such sub-map generation is not strictly necessary to practice the subject invention.

At step 705, the network element DATA is retrieved from a database, such as the database 110 of FIG. 1. The network element DATA comprises all the data associated with the network elements, communications links and other network information associated with a network to be controlled.

At step 706, a determination is made as to whether the network elements within the network should be divided into areas. That is, at step 706 a determination is made as to whether the network elements should be represented as a single area system or a multi-area system. If the network elements are not to be divided into a plurality of areas, then the method 700 proceeds to step 740. If the network elements are to be divided into a plurality of elements, then the method 700 proceeds to step 710. At step 706, user can have single area system or multi area system.

At step 710, the network elements within the network are divided into a plurality of areas, such as previously discussed with respect to FIGS. 3-6. As noted in box 715, the areas may be delineated in terms of geographic location of network elements, customer ownership of network elements or other criteria.

At step 712, area and link data is retrieved and at step 720 an area map is generated for display. For example, at step 720 GUI imagery displayed upon the display device 150 includes, illustratively, a graphical connectivity panel having displayed therein a representation of the various areas defined at step 710.

At step 725, the method 700 waits for user input and, upon receiving such input, proceeds to step 730.

At step 730, a query is made as to whether user input comprises the selection of a bridge or area. That is, at step 730, a determination is made as to whether a user interacting with the workstation 130 selected thereby an area of nodes or a bridge connecting two areas.

If the query at step 730 is answered affirmatively, then the selected bridge or area object is expanded at step 735. That is, the network elements or nodes within the selected area, or the communication links within the selected bridge, are expanded such that a work station user may view the expanded information on the display device 150. Optionally, the areas associated with a starting network element, an ending network element, and/or any ports used to facilitate communications therethrough are not initially expanded. While these areas may be subsequently expanded for display, by initially avoiding such display the imagery of the graphical user interface remains less cluttered. The method then proceeds to step 725 to wait for the next user input.

If a bridge or area has not been selected, then at step 740 a query is made as to whether a node or network element has been selected. If a node or network element has been selected, then at step 745 the node or network element is highlighted, and the properties associated with the node or network element are displayed within the GUI graphical connectivity window. A port on the selected network element may be assigned by default or, via further user interaction. The user may select a particular port to effect a connection to the selected network element.

If a node has not been selected, then at step 755 a query is made as to whether a link has been selected. If a link has been selected, then at step 760, the link is highlighted and the properties associated with the selected link are displayed in the graphical connectivity panel. The user may then select a channel in the link. The method 700 then proceeds to step 765.

If a link has not been selected, then a query is made at step 765 as to whether a channel has been selected. If a channel has been selected, then at step 770 the channel is highlighted and a reservation of the channel and channel timeslot is made.

At step 775, a query is made as to whether the user has selected all the necessary items (i.e., network element, links, channels and the like) to provision the circuit. If the items necessary to complete the circuit have been selected, node, link and channel data is propagated to the database, the provisioning commands are sent to NEs, and the method 700 exits at step 780. If not complete, then the method 700 proceeds to step 725 to wait for the next user input. It is noted that after the selection of all the elements necessary to provision the circuit, the circuit is tested prior to entering service.

The above-described method 700 indicates graphical responses made to user input via the GUI. The selection of various items results in the expansion of the selected item to show corresponding sub-items. Where the sub-items comprise network elements or links between network elements, those selected nodes or links are added to a sub-map that optionally is optionally formed.

In an embodiment of the invention utilizing sub-maps, the following steps may be added. At an optional step 805, the network elements retrieved at step 705 are added to a sub-map. Similarly, at an optional step 810, the retrieved area and link data of step 712 may be added to an area sub-map. At step 820, the sub-map information provided at steps 805 and 810 is used to generate a sub-map for display. After generating a sub-map comprising the network elements of step 805, the method 700 proceeds to step 740. After generating a sub-map for display comprising the areas and link data of step 810, the network 700 proceeds to step 730. While the flow diagram indicates a particular position for steps 805 through 820, it will be appreciated by those skilled in the art that the logical positioning within the flow diagram of these steps may be modified. All that is necessary to implement the sub-map option is the initial generation of a sub-map and the subsequent updating of the sub-map as a user selects additional items.

It is important to note that the network elements may be divided into one or more areas, and that those areas may also comprise one or more empty areas (i.e., areas that do not include a network element). That is, step 805, 810 may be avoided in its entirety, though the method 700 would still be in conformance with the teachings of the present invention.

The above-described method 700 may be modified by those skilled in the art informed by the teachings of the present invention. For example, at step 735 a bridge or area selected by a user is expanded such that displayed imagery including individual network elements and individual communications links and/or channels is presented to a user. As the user continues to select network elements, links, channels and the like to provision the circuit, the user may select a second or next bridge or area object. Upon selecting the second or next bridge or area object, the previously selected bridge or area object may be "contracted" while the newly selected bridge or area object is expanded. In this manner, the graphical display presented to the user remains relatively uncluttered. In general, when user interaction indicates that user processing of a particular bridge or area object is no longer necessary, that bridge or area object may be contracted to reduce such screen clutter and otherwise provide a clean user interface for the operator.

Management and representation methods according to the invention divides the network elements or nodes within the multiple element communication network 140 into a plurality of areas, where each area comprises a plurality of network elements or nodes. The areas may be defined in terms of geographic constraints, such as the network elements representing a city, a portion of a city or other geographic region. The areas may be defined in terms of customer constraints, such as the network elements within customer owned or operated networks forming the communication network 140.

Figure 8:
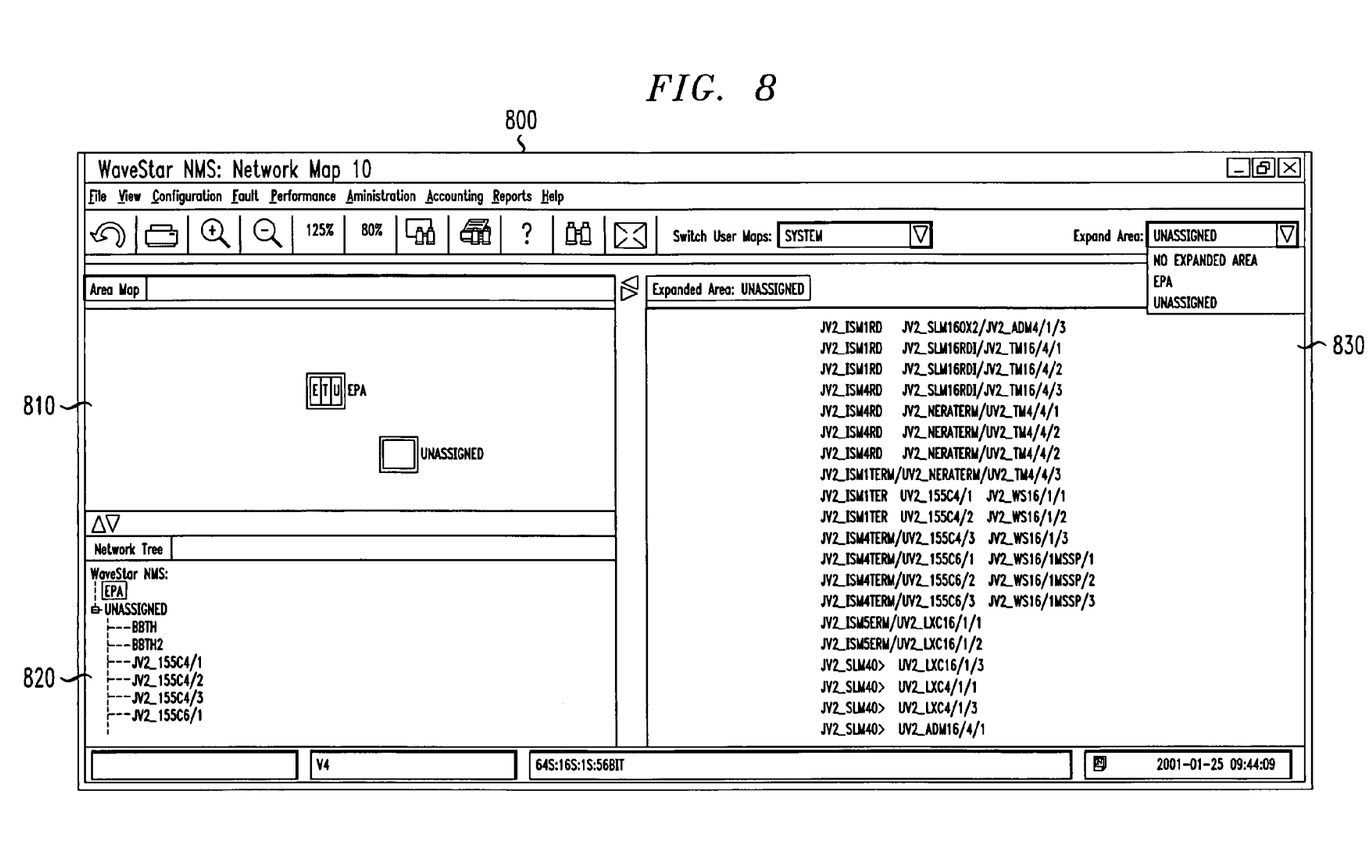
FIG. 8 depicts a user screen suitable for use in a GUI according to an embodiment of the invention.

FIG. 8 depicts a user screen suitable for use in a GUI according to an embodiment of the invention. Specifically, a us er screen 800 comprises an area map window 810, a network tree window 820 and an expanded area screen 830. More or fewer windows related to network management and representation functions may be displayed at one time. As noted in FIG. 8, an unassigned area denoted as "UNASSIGNED" is shown in the area map 810. The network tree 820 depicts the unassigned area and a plurality of network elements/aggregates and/or links associated with the unassigned area. The expanded area 830 comprises an expanded view of the unassigned area within the area map 810.

Figure 9:
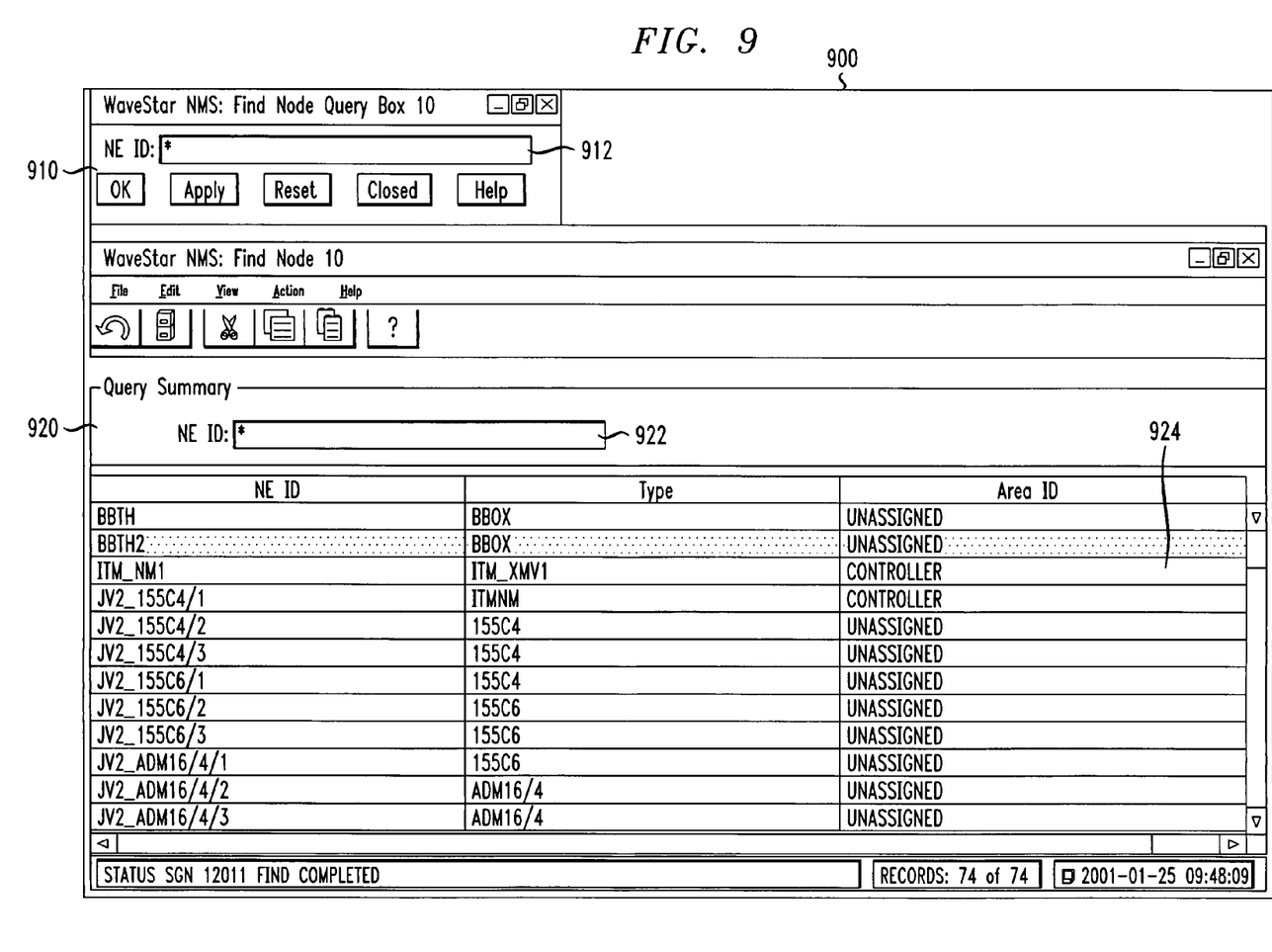
FIG. 9 depicts a user screen suitable for use in a GUI according to an embodiment of the invention and FIG. 10 depicts a user screen suitable for use in a GUI according to an embodiment of the present invention.

FIG. 9 depicts a user screen suitable for use in a GUI according to an embodiment of the invention. Specifically, the user screen 900 comprises a query window 910, illustratively a find node query window, including a field 912 for receiving query input from a user. A query status window 920 includes various imagery associated with the query requested via the query window 910. The specific query depicted in FIG. 9 comprises a find node query, where a network element or node identification is entered in field 912 of the query window 910. The query summary field 920 includes the requested query item in a corresponding field 922, as well as a data field 924 including data elements (illustratively network element identifications) associated with the query.

Figure 10:
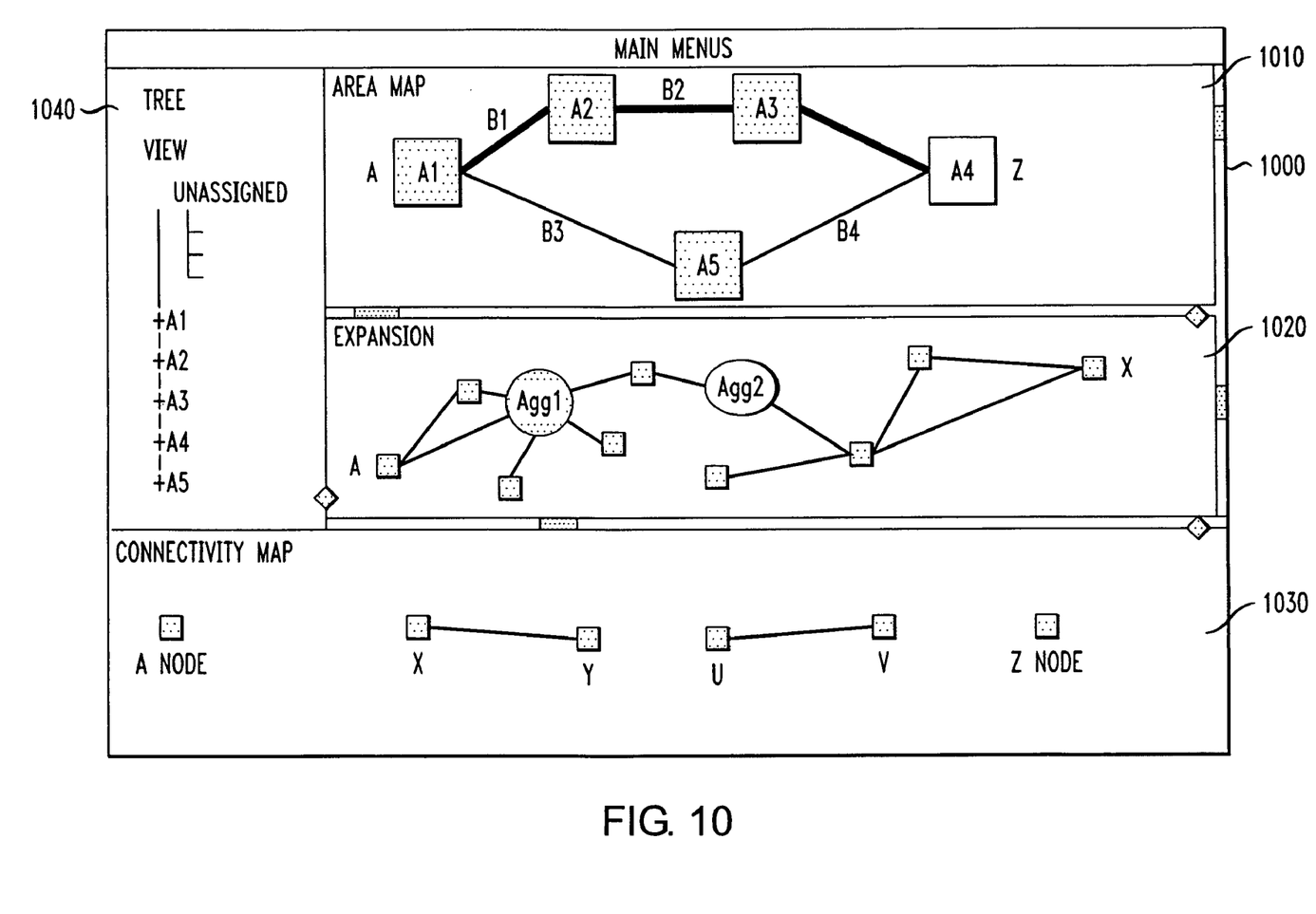

FIG. 10 depicts a user screen suitable for use in a GUI according to an embodiment of the present invention. Specifically, the user screen 1000 of FIG. 10 comprises an area map window 1010, an expansion window 1020, a connectivity map window 1030 and a tree view window 1040. In the area map window 1010, five areas denoted as areas A1, A2, A3, A4 and A5 are depicted. Areas A1 and A2 are connected via a bridge B1. Areas A2 and A3 are connected by a bridge B2. Areas A4 and A5 are connected by a bridge B4. Areas A5 and A1 are connected by a bridge B3. Each of the bridges includes at least one communications link. It is noted that a circuit is to be provisioned between a network element A within area A1, and a network element X within area A4.

The expansion window 1020 depicts two aggregates, denoted as AGG1 and AGG2.

The connectivity map window 1030 discloses the two nodes forming the start node and end node of a circuit to be provisioned (i.e., nodes A and Z). Additionally, a portion of the circuit has been provisioned by the user. Specifically, the window 1000 of FIG. 10 depicts user interface imagery during a provisioning operation, wherein a link establishing a connection between nodes X and Y has been established, and a link establishing a connection between nodes U and V has been established. Additional links between nodes A and X, Y and U and V and Z are yet to be established, thereby provisioning the circuit.

The tree view window 1040 depicts a tree identifying areas within the network shown in the area map window 1010. Specifically, an assigned or default area is shown and includes a plurality of network elements and links (not shown). Each of areas A1 through A5 are also shown in the tree view. The "plus" sign next to each denoted area indicates that additional information pertaining to the elements contained within the area may be viewed by user selection of the appropriate "plus" sign.

It is important to note that the above-described system supports coexistence of submaps based on nodes and submaps based on areas. These modifications and other modifications readily devised by those skilled in the art and informed by the present disclosure are all contemplated by the present inventors.

In one embodiment, the invention provides a method of managing network elements from a number of areas which are required for regular monitoring and provisioning by means of creating a user-defined sub-map. In another embodiment, the invention comprises a method of managing a customized set of areas which are required for regular monitoring and provisioning by means of creating user-defined area maps.

Although various embodiments, which incorporate the teachings of the present invention, have been shown and described in detail herein, those skilled in the art can readily devise many other varied embodiments that still incorporate these teachings. As such, the appropriate scope of the invention is to be determined according to the claims, which follow herewith.

What is claimed is:

1. A method for provisioning a circuit between a starting network element and an ending network element, comprising:

(a) representing network elements within a network as a plurality of area objects, each area object including a plurality of the network elements;

(b) representing communications links between two area objects as a bridge object, each bridge object having at least one communications link between any of the plurality of network elements in a first of the two area objects and any of the plurality of network elements in a second of the two area objects, each communications link comprising at least one communications channel;

(c) iteratively performing the following tasks using the area objects and bridge objects until selections enabling the provisioning of said circuit are made:

(c1) expanding a selected area object to display the corresponding plurality of network elements and selecting at least one of the displayed network elements;

(c2) expanding a selected bridge to display the corresponding at least one communications link and selecting at least one of the displayed communications links;

(c3) highlighting each selected network element, communications link and communications channel;

(d) adding each selected area object and each selected bridge object to an area submap and adding each selected network element and each selected communication link to a node submap, said area submap and said node submap being used to generate respective first and second images in a graphical user interface (GUI).

2. The method of claim 1, wherein step (c) further comprises:
(c4) reserving a time slot for each selected link.

3. The method of claim 1, wherein said area object including said starting network element is initially displayed as an expanded area object.

4. The method of claim 1, wherein area objects corresponding to said starting network element and said ending network element are selected without being expanded.

5. The method of claim 1, further comprising:
contracting each expanded area object as a new area object is selected for expansion.

6. The method of claim 1, further comprising:
contracting each expanded bridge object as a new bridge object is selected for expansion.

7. The method of claim 1, wherein said area objects are determined according to at least one of a geographic location of network elements a customer association with network elements, and a technology commonality of network elements.

8. The method of claim 1, wherein said node submap defines said circuit being provisioned.

9. The method of claim 1, wherein said area objects and said bridge objects are displayed in a first image region, said area submap is displayed in a second image region, and said node submap is displayed in a third image region.

10. A method for generating an area submap adapted for use in provisioning a circuit between a starting network element and an ending network element and a node submap associated with a circuit provisioned between the starting network element and the ending network element, for display in a graphical user interface (GUI), comprising:
dividing representations of elements within a network into a plurality of area objects, each area object having associated with it a respective plurality of network elements and communication links;
representing communications links between two area objects as a bridge object, each bridge object having at least one communications link between any of the plurality of network elements in a first of the two area objects and any of the plurality of network elements in a second of the two area objects;
generating the area submap by:
selecting, in response to user interaction, a subset of said area objects;
selecting each bridge object between ones of the area objects in the selected subset of area objects; and
adding said selected area objects and said selected bridge objects to said area submap, said area submap being used to display a first image in said GUI; and
generating the node submap by:
selecting ones of the area objects associated with the circuit and selecting at least one of the corresponding network elements of each of the selected ones of the area objects;
selecting ones of the bridge objects associated with the circuit and selecting at least one of the corresponding communication links of each of the selected ones of the bridge objects; and
adding each selected network element and each selected communication link to said node submap, said node submap being used to display a second image in said GUI.

11. The method of claim 10, wherein each of said plurality of areas comprise at least one of geographic areas and customer areas.

12. The method of claim 10, wherein said subset of areas comprises areas associated with those communications links that form a shortest path between said starting network element and said ending network element.

13. A graphical user interface (GUI), comprising:
a plurality of area objects, each area object comprising a plurality of network element objects, each network element object representing a respective element within a network;
a plurality of bridge objects, each bridge object comprising at least one communications link object between any of the plurality of network element objects in a first of the two area objects and any of the plurality of network element objects in a second of the two area objects, each communications link object comprising at least one channel object, each channel object representing a respective communications channel within the network; wherein:
in response to a user selection of an area object, the selected area object is expanded to graphically represent its constituent network element objects and an instance of the selected area object is generated for use in an area submap;
in response to a user selection of a bridge object, the selected bridge object Is expanded to graphically represent its constituent communications link objects and an instance of the selected bridge object is generated for use in an area submap;
in response to a user selection of a network element object the network element corresponding to the selected network object is selected for use in a circuit and an instance of the selected network element object is generated for use in a node submap;
in response to a user selection of a communications link object, the selected communications link object is expanded to graphically represent its constituent channel objects and an instance of the selected communications link object is generated for use in a node submap;
in response to a user selection of a channel object, the channel corresponding to the selected network object is selected for use in a circuit;
adding each area object instance and each bridge object instance to said area submap, said area submap being used to generate a first image in said GUI; and
adding each network element object instance and each communications link object instance to said node submap, said node submap being used to generate a second image in said GUI.

14. The GUI of claim 13, wherein time slot is reserved for each selected channel.

15. The GUI of claim 13, wherein each selected channel is added to said node submap.

16. The GUI of claim 13, wherein said area object including said starting network element is initially displayed as an expanded area object.

17. The GUI of claim 13, wherein:
in response to a user selection of a next area object, a previously expanded area object is contracted.

18. The GUI of claim 13, wherein:
in response to a user selection of a next bridge object, a previously expanded bridge object is contracted.

19. The GUI of claim 13, wherein said area objects are determined according to at least one of a geographic location of network elements, a customer association with network elements, and a technology commonality of network elements.

* * * * *